United States Patent
Rowitch (10) Patent No.: US 6,825,805 B2
(45) Date of Patent: Nov. 30, 2004

(54) SEARCH PROCEDURE FOR POSITION DETERMINATION SYSTEM

(75) Inventor: Douglas N. Rowitch, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 5 days.

(21) Appl. No.: 10/233,128

(22) Filed: Aug. 29, 2002

(65) Prior Publication Data

US 2004/0041729 A1 Mar. 4, 2004

(51) Int. Cl.$^7$ .............................................. H04B 7/185
(52) U.S. Cl. ................................................ 342/357.15
(58) Field of Search ....................... 342/357.15, 357.12, 342/357

(56) References Cited

U.S. PATENT DOCUMENTS

| | | | | |
|---|---|---|---|---|
| 5,917,444 A | * | 6/1999 | Loomis et al. | 342/357.12 |
| 6,133,873 A | | 10/2000 | Krasner | 342/357.12 |
| 2002/0005802 A1 | * | 1/2002 | Bryant et al. | 342/357.01 |

FOREIGN PATENT DOCUMENTS

| | | | | |
|---|---|---|---|---|
| EP | 0635728 | 1/1995 | | G01S/5/14 |
| WO | 02059639 | 8/2002 | | G01S/5/14 |

OTHER PUBLICATIONS

P.W. Ward, GPS receiver search techniques, IEEE Position Location and Navigation Symposium, pp. 604–611, Apr. 1996.*

Barry A. Stein, "Satellite Selection Criteria During Altimater Aiding of GPS", Navigation, Institute of Navigation, Washington D.C., vol. 32, No. 2, Jun. 1985.

* cited by examiner

Primary Examiner—Bernarr E. Gregory
Assistant Examiner—Fred H Mull
(74) Attorney, Agent, or Firm—Philip Wadsworth; Charles Brown; Richard Bachand (57) ABSTRACT

A method of and system for performing a search for signals useful in determining the position of an entity. A first search is performed as part of a position determination attempt, and measurements are derived from the ensuing search results. Additional searching within the position determination attempt is avoided if the measurements satisfy one or more selected exit criteria. However, a second search is conducted if the measurements do not satisfy the one or more selected exit criteria.

10 Claims, 8 Drawing Sheets

SEARCH PROCEDURE FOR POSITION DETERMINATION SYSTEM

FIELD OF THE INVENTION

The subject matter disclosed herein relates to the fields of position determination, and, more specifically, to procedures for searching for signals useful in the position determination process, deriving measurements from these signals, and determining the position of an entity based on these measurements.

RELATED ART

A GPS geo-location system is a system of earth orbiting satellites that enables a receiver of signals from the satellites to determine the position of the receiver. Each of the satellites transmits a signal that is frequency spread with a repeating pseudo-random noise (PN) code of 1,023 chips uniquely identifying the satellite. The 1,023 chips repeat every millisecond. The signal is also modulated with data bits that have a 20 ms duration.

Figure 1:
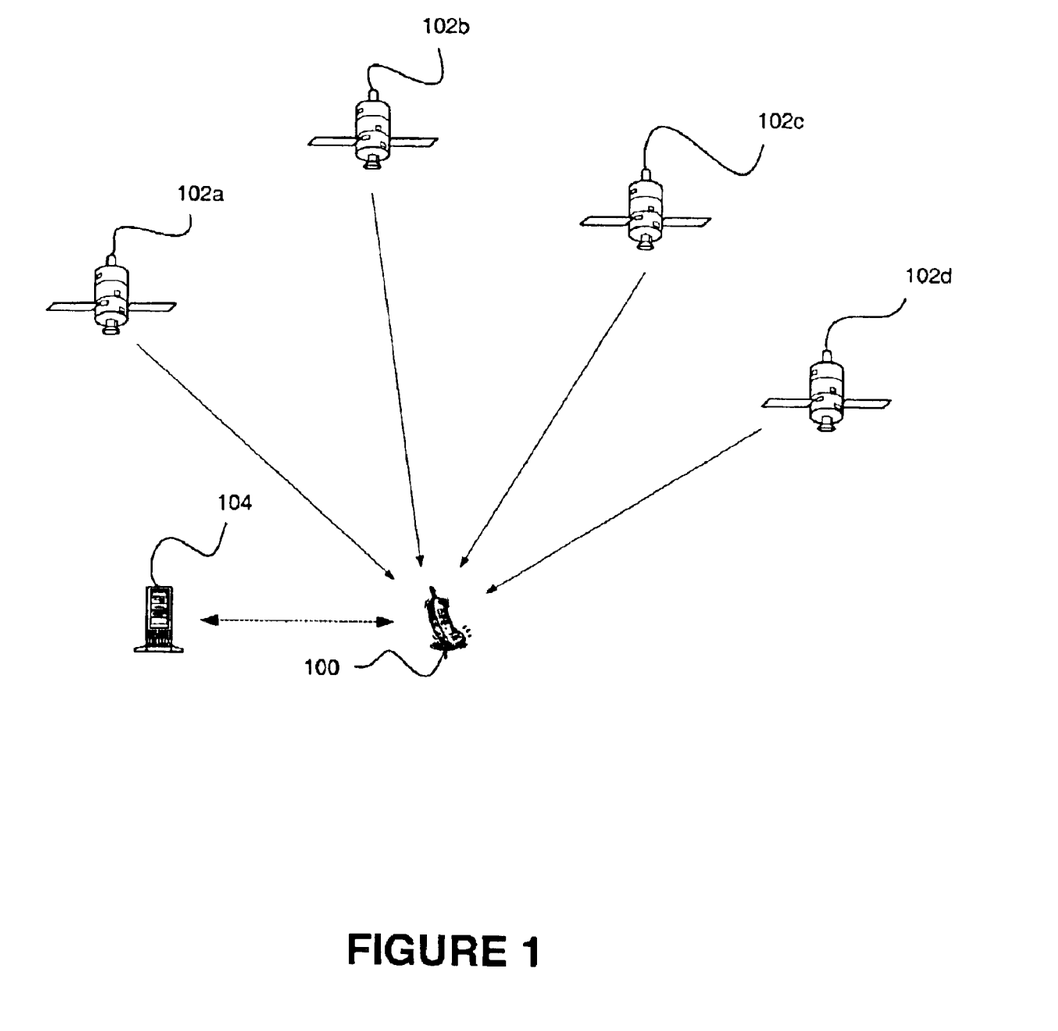
FIG. 1 is a diagram of a GPS geo-location system.

FIG. 1 illustrates an application of the GPS geo-location system in which a receiver 100 in a wireless communications system receives transmissions from satellites 102a, 102b, 102c, 102d visible to the receiver 100. The receiver 100 derives time measurements from four or more of the transmissions. The receiver 100 provides the measurements to a position determination entity (PDE) 104, which determines the position of the receiver 100 from the measurements. Alternatively, the receiver 100 may determine its own position from this information.

The receiver 100 searches for a transmission from a particular satellite by correlating the PN code for the satellite with a received signal. The received signal is typically is a composite of transmissions from several satellites visible to the receiver 100 in the presence of noise. The correlation is performed over a range of possible shifts of the PN code. Each unique time shift is referred to as a time hypothesis. The complete set of hypotheses that are tested are referred to as a search window in time. The search window is also referred to as a search window in code space, since each offset refers to a different point within the code sequence that makes up the "code space".

Each correlation is performed over an "integration time". The "integration time" is the coherent integration time multiplied by the number of coherent integrations that are non-coherently combined.

For a particular PN code, the amount of correlation is referred to as the correlation value. If there is strong correlation between the code with which the received signal was frequency spread and the locally generated PN code, then the correlation value is high. The correlation values associated with each hypothesis define a correlation function. Peaks in the correlation function are located, and compared to a predetermined noise threshold. The threshold is selected so that the probability of falsely detecting a satellite transmission is below a predetermined level. A measurement of the relative time of arrival of the signals received from each satellite is determined by the location of the earliest peak that is above the selected threshold. It should be noted that peaks may have what is commonly referred to as side lobes. Side lobes are humps (or lower level peaks) on either side of a true peak. Such side lobes are ignored if detected.

There is a tradeoff between the accuracy and sensitivity of the search and the amount of time required to perform the search. This tradeoff is made by setting the coherent integration time, the number of coherent integrations, and the widow search size. The larger these values are, the higher the sensitivity of the receiver 100. Higher sensitivity means better detection of weak or delayed transmissions. This results in higher accuracy in the ensuing position estimates. On the other hand, if these values are larger, then a longer time is required to obtain the necessary time measurements. The risk that the receiver 100 will saturate also increases as the magnitude of these values increases.

When the transmissions from the satellites are expected to be strong, the search parameters should be set relatively low to minimize the search time. This reduces the risk that the receiver 100 with be saturated. The satellite transmissions are likely to be strong when, for example, the subscriber station is located outside on a clear day with no atmospheric or weather related disturbances. On the other hand, when the transmissions from the satellites are expected to be weak or delayed, the search parameters should be set relatively high to avoid missing weak or delayed signals. It should be clear that missing signals compromises the accuracy of the resulting position estimate. The satellite transmissions are likely to be weak or delayed when, for example, the subscriber station is located inside or there are atmospheric or weather related disturbances.

Since many subscriber stations are mobile, it cannot generally be known beforehand whether the transmissions will be strong or weak. Consequently, there is no way to determine how to set the search parameters in any particular circumstance. Accordingly, it would be advantageous to be able to set the search parameters in a way that ensures that weak signals will be detected, but that strong signals can be detected quickly an without saturating the receiver.

SUMMARY

A method is described for searching for signals to be used in determining the location of a receiver. The method begins by conducting a first search. Measurements are derived from the results of this first search. Additional searching is avoided if the measurements satisfy one or more selected "exit" criteria. The position of the receiver is determined based on the measurements made from the first search.

A second search is conducted if the measurements do not satisfy the selected exit criteria. In one application, the position of the entity is then determined based on the measurements from the second search, or the combination of the first and second searches.

In one embodiment, the first search emphasizes speed rather than accuracy and sensitivity. The exit criteria are selected with the goal of ensuring that the measurements resulting from the first search are sufficient to determine the position of the entity at a desired level of accuracy. The second search is avoided if the measurements satisfy these criteria. If the measurements do not satisfy the selected criteria, then the second search is conducted. This second search emphasizes accuracy and sensitivity rather than speed.

In one implementation, the receiver is searching for signals transmitted by GPS satellites. In this implementation, all of the GPS satellites that the receiver is searching for define a "first satellite set". Those satellites in the first satellite set for which the correlation value equals or exceeds a predetermined "noise threshold" define a "second satellite set". Those satellites in the second satellite set that have a correlation value equal to or greater than a "second threshold" define a "third satellite set". The second threshold is higher than the first threshold. A fourth set comprises all the satellites in the first set but excludes the satellites in the third set.

In one embodiment, a second search is avoided if all of the satellites in the first satellite set have a correlation value that equals or exceeds the second threshold. That is, the number of satellites in the third satellite set equals the number of satellites in the first satellite set.

In a second embodiment, the second search is avoided if a metric (i.e., a signal quality factor) determined from the azimuth angle of each satellite in the second set and the peak carrier signal to noise ratio of each such satellite exceeds a predetermined threshold.

In a third embodiment, the second search is avoided if the number of satellites in the second set equals or exceeds a predetermined threshold.

In a fourth embodiment, the second search is avoided if the peak carrier signal to noise ratio for each of the measurements in the second set equals or exceeds a predetermined threshold.

A fifth embodiment combines two or more of the four previously mentioned embodiments.

BRIEF DESCRIPTION OF THE DRAWINGS

The components in the figures are not necessarily to scale. Rather, the emphasis is placed on illustrating the principles of the disclosed subject matter. In the figures, like reference numerals designate like parts.

DETAILED DESCRIPTION

As utilized herein, terms such as "about" and "substantially" are intended to allow some leeway in mathematical exactness to account for tolerances that are acceptable in the trade. Accordingly, any deviations upward or downward from the value modified by the terms "about" or "substantially" in the range of 1% to 20% should be considered to be explicitly within the scope of the stated value.

Moreover, as used herein, the term "software" includes instructions used to cause a programmable device to perform a function. Accordingly, software includes, for example, such things as source code, object code, binary code, firmware, macro-instructions, micro-instructions, or any combination of two or more of the foregoing.

Furthermore, the term "memory" refers to any processor-readable medium, including but not limited to RAM, ROM, EPROM, PROM, EEPROM, disk, floppy disk, magnetic drum, hard disk, CD-ROM, DVD, or the like, or any combination of two or more of the foregoing, on which software can be stored.

The term "processor" refers to any device capable of executing software. Accordingly, processor includes general- or special-purpose microprocessor, finite state machine, controller, computer, digital signal processor (DSP), or the like.

The term satellite means a navigational satellite, such as a GPS satellite.

Figure 2:
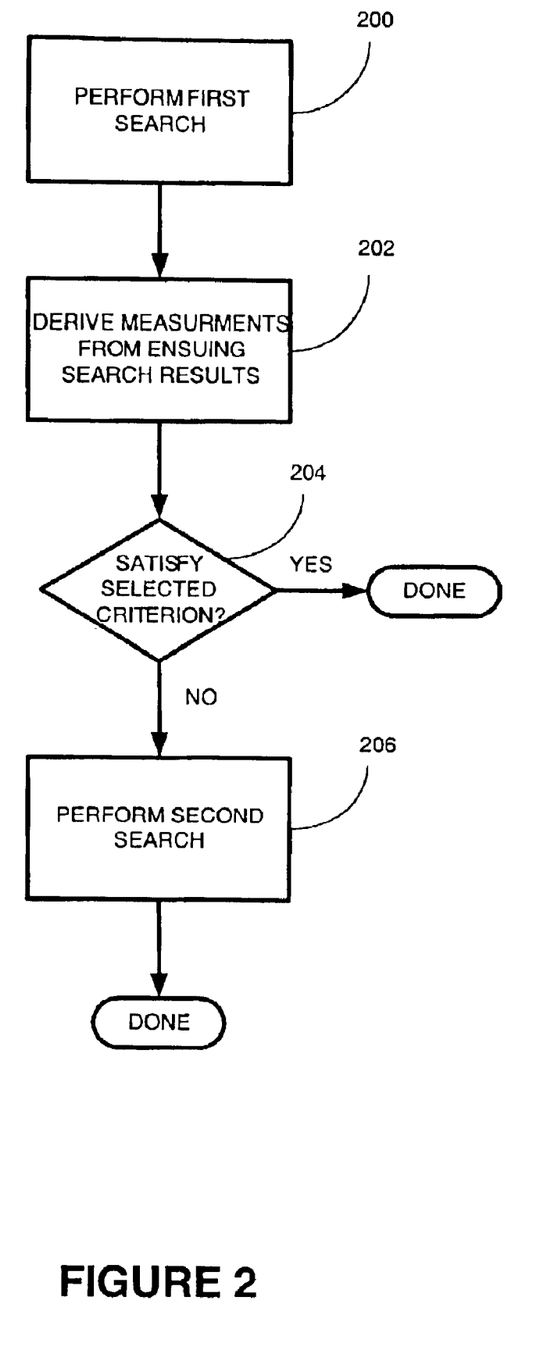
FIG. 2 is a flowchart of a method for searching for signals useful in determining the position of an entity according to one embodiment of the disclosed subject matter.

FIG. 2 is a flowchart of a method for searching for signals useful in determining the position of an entity in accordance with one embodiment of the disclosed subject matter. The method begins with step 200, which comprises conducting a first search as part of a position determination attempt. From step 200, the method proceeds to step 202. In step 202, measurements are derived from the search results.

From step 202, the method proceeds to step 204. Step 204 determines whether the measurements resulting from the first search satisfy one or more selected "exit" criteria. If the measurements satisfy the one or more of the selected exit criteria, additional searching within the position determination attempt is avoided. If the measurements do not satisfy the one or more selected exit criteria, step 206 is performed. Step 206 performs a second search for signals useful in determining the position of the entity.

Figure 3:
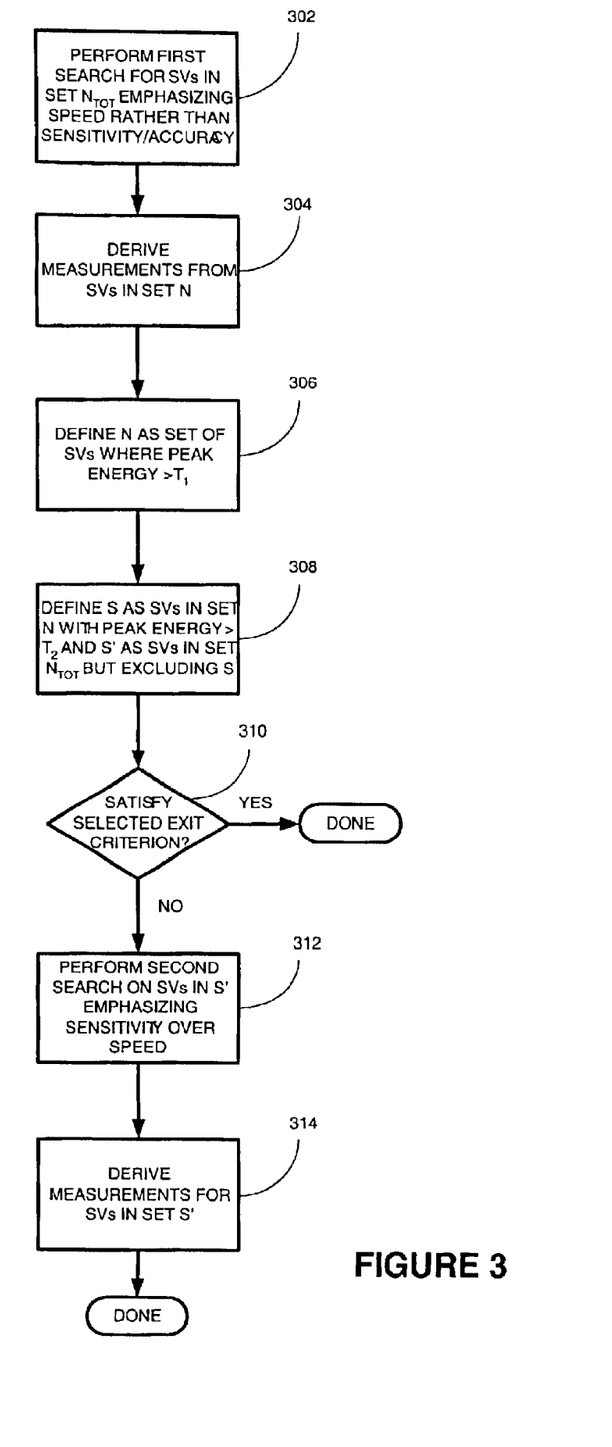
FIG. 3 is a flowchart of a method for searching for signals useful in determining the position of an entity in accordance with a second embodiment of the disclosed subject matter.

A second embodiment of the method for searching for signals useful in determining the position of an entity is illustrated in FIG. 3. In this embodiment, the method begins with step 302, which comprises searching for transmissions from satellites in a first set. The search emphasizes speed rather than accuracy and sensitivity.

In one example, in which the entity is a subscriber station in a wireless communications system, the PDE provides the subscriber station with acquisition assistance information (AAI) indicating which satellites are likely to be transmitting signals that the subscriber station can receive. Satellites that transmit signals that can be received by a receiver are commonly referred to as "satellites in view" or "satellites that are visible". These satellites form a first satellite set. In a second example, AAI is unavailable. Therefore, the first satellite set consists of all satellites in the GPS geo-location system. In a third example, the subscriber station has access to a recent "almanac". An almanac is information transmitted by a GPS satellite, for example, that indicates the location and orbit of the satellites in the GPS constellation. In addition, the subscriber station has access to an approximate measure of time and coarse knowledge of its own position. From the almanac, the time, and the coarse knowledge of it position, the subscriber station predicts which satellites are visible to it. These satellites form the first satellite set in this example.

From step 302, the method proceeds to step 304. In step 304, measurements are derived from the search results. In one example, the measurements comprise a signal to noise ratio (SNR) and code phase (time) for each of the discernable correlation value peaks. Side lobes, if detected, are ignored.

Step 306 follows step 304. In step 304, the SNR measurements from the first search are compared to a first noise threshold. The first noise threshold is set at a level that ensures that the false alarm probability is below a predetermined level. The satellites that exceed the first noise threshold form a second satellite set.

From step 306, the method proceeds to step 308. In step 308, the SNR measurements are compared to a second threshold. The second threshold is higher than the first. Satellites that exceed the second threshold form a third satellite set. A fourth satellite set is defined as all the satellites in the first satellite set, but excluding the satellites in the second satellite set. Accordingly, the fourth satellite set includes all of the satellites of the first satellite group from which the signals are received at a level below the second threshold.

Step 310 follows step 308. In step 310, the measurements are examined to determine if they satisfy one or more exit criteria. The exit criteria are selected to ensure that the quality of the measurements is sufficient to determine the position of the entity to a desired level of accuracy. If these measurements satisfy one or more of the selected exit criteria, additional searching is avoided. If these measurements do not satisfy the one or more selected exit criteria, step 312 is performed.

In step 312, a second search is performed. This second search emphasizes accuracy and sensitivity rather than speed, and thus utilizes a longer integration time in the correlation process, resulting in a longer time-to-fix. The second search is conducted only for those satellites in the fourth satellite set. Once the second search has been conducted, step 314 is performed. In step 314, measurements of the signals received from the satellites in the fourth set are derived from the search results. The method then concludes.

In one application, the position of the entity is determined based on the measurements from the first search if that is the only search performed. If both searches are performed, the position of the entity is determined based on the measurements from the second search, or the combination of the first and second searches. In one example, where both searches are performed, the position of the entity is determined based on the measurements for the satellites in the third set resulting from the first search and the measurements for the satellites in the fourth set resulting from the second search.

In one configuration, these measurements are provided to a device, such as a position determining entity (PDE), that estimates the position of the entity based on the measurements. Alternatively, the entity estimates its own position from these measurements.

In one implementation, the second search is avoided if | the number of satellites in the third set, equals the number of satellites in the first set, indicating that all satellites searched for satisfy the second threshold.

In a second implementation, a polygon is constructed from the measurements associated with the satellites in the second set. For each of these satellites, a vector is formed from the satellite azimuth angle and peak carrier signal to noise ratio. The orientation of the vector is determined based on the azimuth angle (i.e., elevation from the horizon into the sky) of the satellite. The magnitude of the vector is based on the magnitude of the peak carrier signal to noise ratio. The vectors are oriented in a coordinate system. The endpoints of the vectors are connected to one another to define a polygon. In this implementation, the second search is avoided if the area of the polygon equals or exceeds a threshold. It should be understood that the greater the variation in azimuth the larger the area of the polygon. In addition, the stronger each signal is, the greater the area of the polygon. Therefore, it is understood that a field of satellites that are spread across the sky and which have strong signals will result in a polygon with the greatest area.

Figure 4:
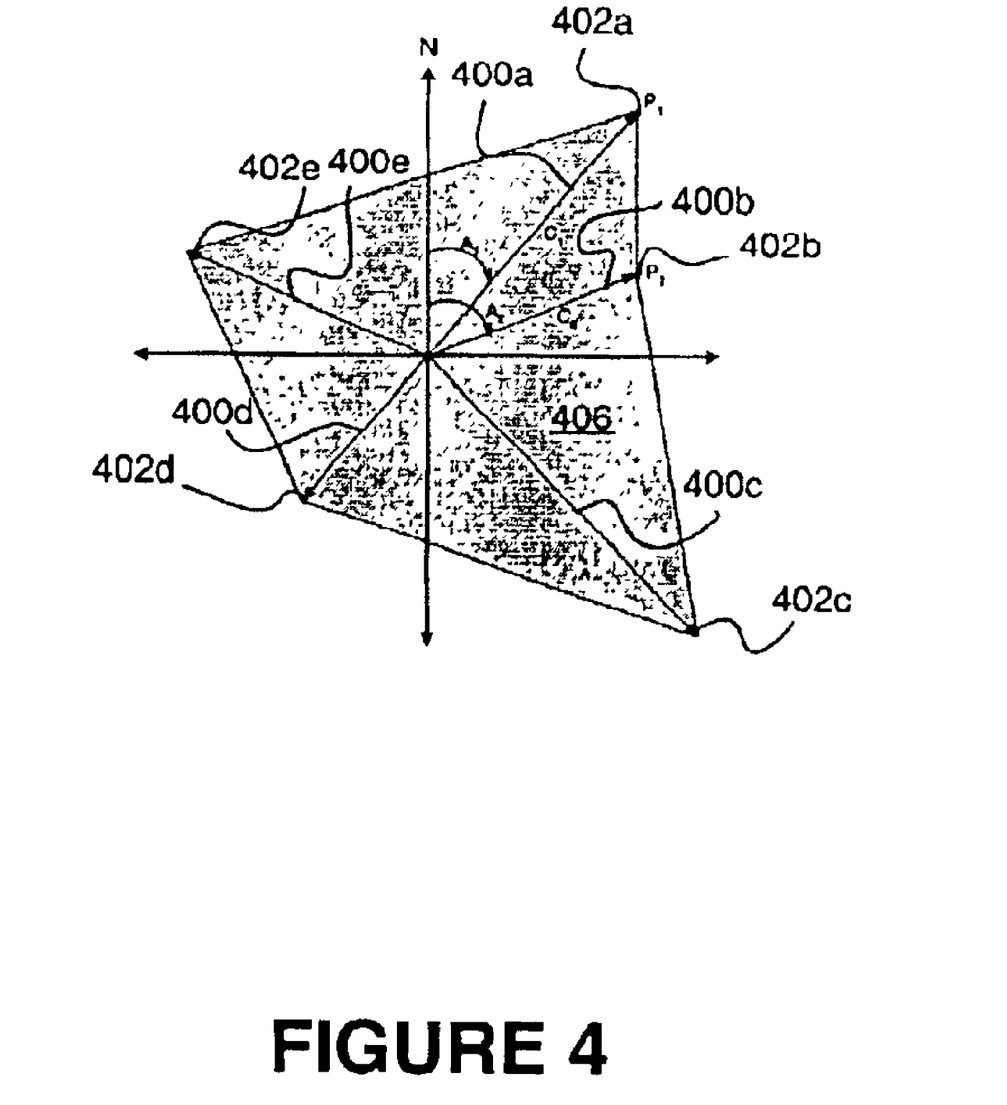
FIG. 4 illustrates an example of a polygon formed by measurements derived from an initial search, where the area of the polygon indicates the quality of the measurements.

FIG. 4 illustrates an example of a polygon defined by the five vectors 400a, 400b, 400c, 400d, and 400e. Each of these vectors represents or corresponds to a measurement. More specifically, the angle between the vector and the vertical axis is the azimuth angle for the satellite, and the magnitude of the vector is the peak carrier signal to noise ratio. The endpoints of the vectors are identified with numerals 402a, 402b, 402c, 402d, and 402e. The polygon which is defined by these endpoints is identified with numeral 406. The area of this polygon, which is determined using known techniques, is used in the above comparison.

In a third implementation, the second search is avoided if the number of satellites in the second set, equals or exceeds a threshold.

In a fourth implementation, the peak carrier signal to noise ratio for each of the satellites in the second set is summed. The second search is avoided if this sum equals or exceeds a predetermined threshold.

Figure 5A:
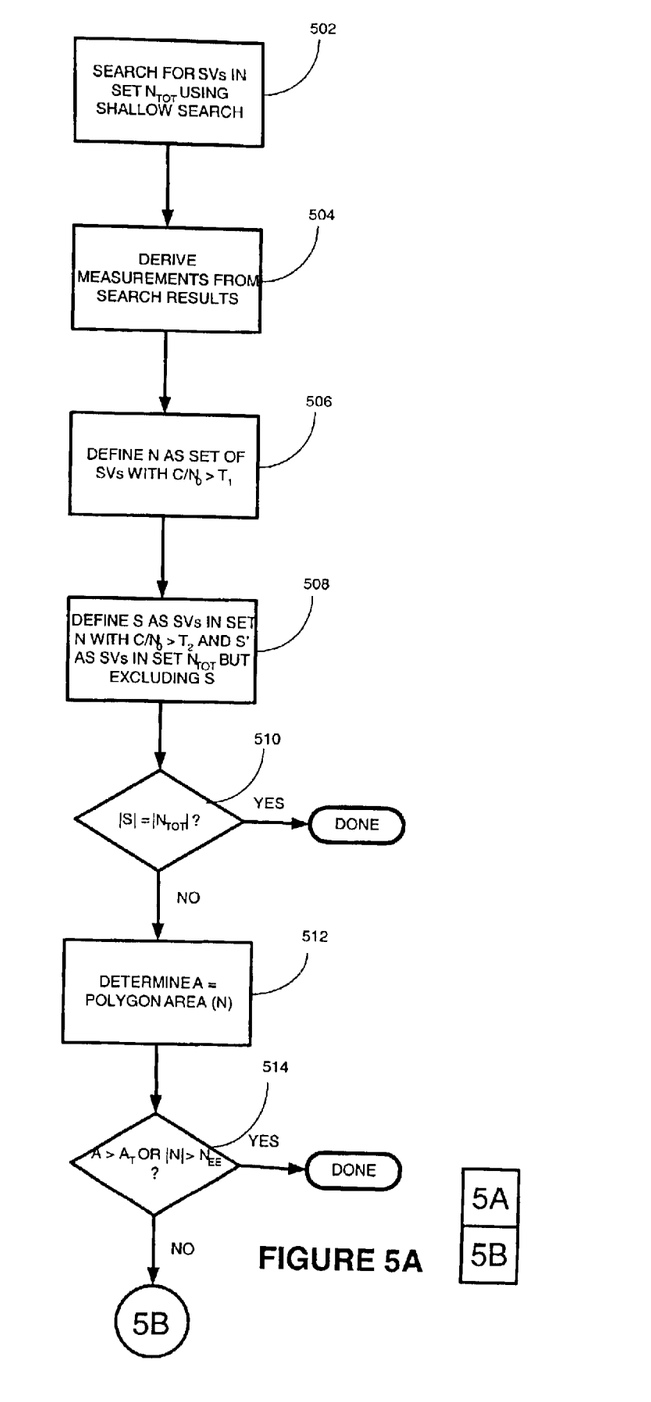
FIGS. 5A–5B comprise a flowchart of a method for searching for signals useful in determining the position of an entity in accordance with another embodiment of the disclosed subject matter.
Figure 5B:
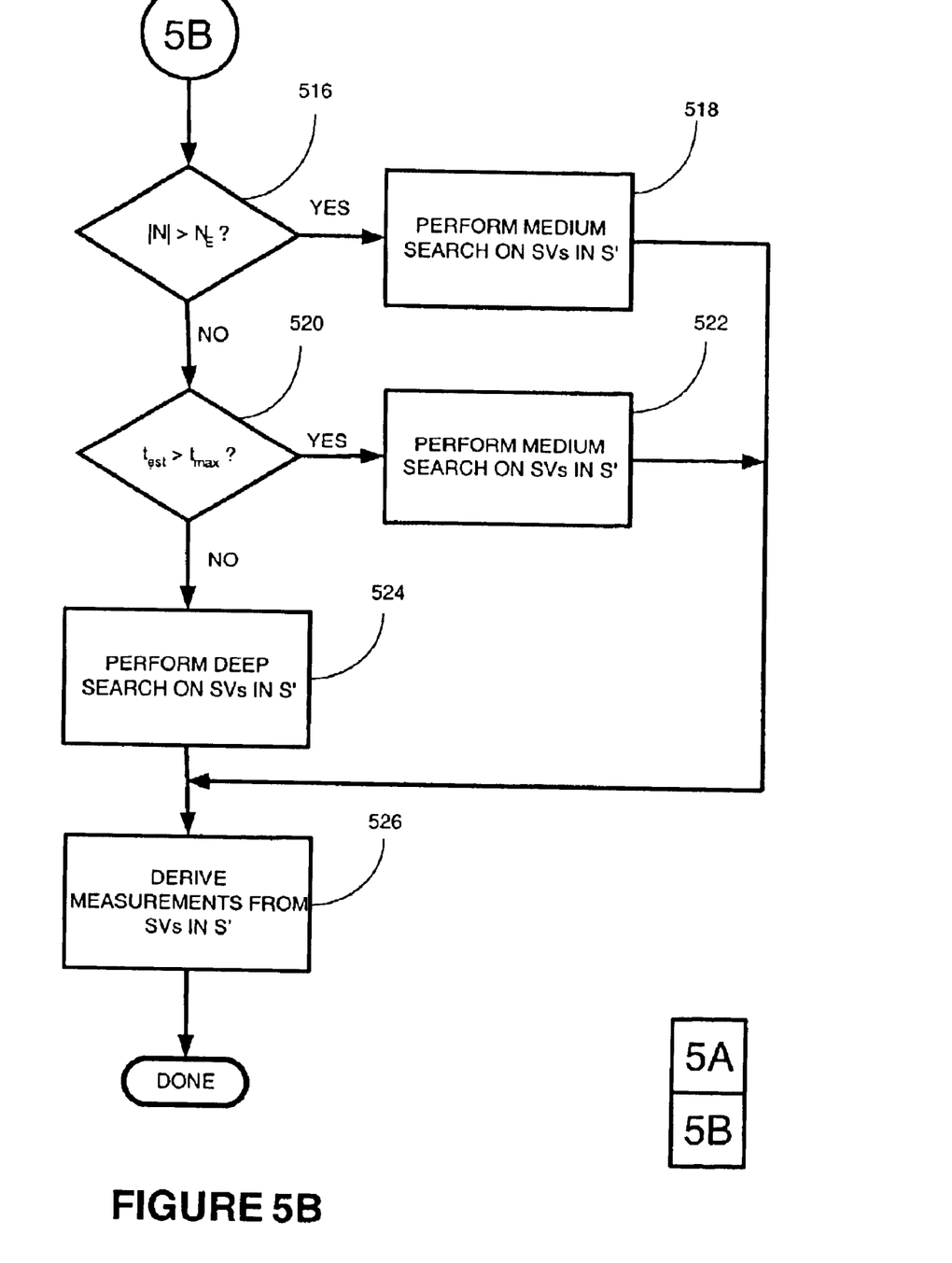

FIGS. 5A–5B comprise a flowchart illustrating an implementation example of a method according to the disclosed subject matter of searching for signals useful in determining the position of an entity.

In this example, a user selects one of three available options, each defining a tradeoff between time-to-fix and accuracy/sensitivity. The first option provides the best time-to-fix. The second option provides the next best time-to-fix, but also provides better accuracy and sensitivity than the first option. The third option provides the best accuracy and sensitivity but worst time-to-fix of the three.

The method begins with step 502, which comprises searching for and locating transmissions from satellites in the first set. A shallow search is performed in this step. A shallow search is defined herein as one that emphasizes speed rather than accuracy and sensitivity. In one example, the search parameters for the shallow search specify a total integration time of 80 ms, a coherent integration time of 20 ms, and the number of coherent integrations which are non-coherently combined equal to 4.

From step 502, the method proceeds to step 504. In step 504, measurements are derived from the search results. In one example, the measurements comprise the peak carrier signal to noise ratio and code phase for each of the discernable peaks.

Step 506 follows step 504. In step 506, the measurements are compared to a predetermined noise threshold Those satellites, where the peak carrier signal to noise ratio exceeds the predetermined noise threshold, form the second set.

In one example, the noise threshold depends on the search parameters. For a shallow search, the noise threshold is set to 25.0 dB-Hz. For a medium search, to be discussed in relation to steps 518 and 522, the noise threshold is set to 18.1 dB-Hz. For a deep search, to be discussed in relation to step 524, the noise threshold is set to 14.0 dB-Hz.

Step 508 follows step 506. In step 508, the measurements are compared to a second threshold The second threshold is higher than the first. The third set is defined as those satellites in the first set that satisfy the second threshold. The fourth set is defined as those satellites in the first set but excluding S.

In one example, the second threshold varies with the time-to-fix vs. accuracy/sensitivity option selected by the user. In one configuration, the second threshold for the first, second, and third options is respectively set to 29.4 dB-Hz, 32.4 dB-Hz, and ∞. The latter refers to a setting which is so large that the second threshold will never be satisfied.

Step 510 follows step 508. In step 510, |S|, the number of satellites in the third set, is compared with $|N_{TOT}|$, the number of satellites in the first set. If |S| equals $|N_{TOT}|$, indicating that all satellites searched for in step 502 satisfy the second threshold, the method completes. If not, the method proceeds with step 512.

In step 512, the polygon described earlier in relation to FIG. 4 is formed from the measurements for the satellites in the second set, and the area A of this polygon is determined.

Step 514 follows step 512. In step 514, the area A of the polygon is compared to a threshold area $A_T$. In addition, |N|, the number of satellites in the second set, is compared to a threshold $N_{EE}$. If the area A exceeds $A_T$ or |N| exceeds $N_{EE}$, the method terminates. Otherwise, the method proceeds with step 516 in FIG. 5B.

In one example, the threshold area $A_T$ and the threshold number $N_{EE}$ vary with the time-to-fix vs. accuracy/sensitivity threshold selected by the user. In one configuration, the threshold area $A_T$ for the first, second, and third options is respectively set to $4 \times 10^7$, $6 \times 10^7$, and $\infty$. The latter refers to a setting which so large that the threshold is never satisfied. In addition, the threshold number $N_{EE}$ for the first, second and third options is respectively set to 4, 5, and $\infty$. Again, the latter refers to a setting which is so large that the threshold is never satisfied.

In step 516, |N|, the number of satellites in the second set, is compared with a second threshold number $N_E$. If |N| exceeds $N_E$, step 518 is performed. Otherwise, the method proceeds with step 520.

In one example, the second threshold number $N_E$ varies with the time-to-fix vs. accuracy/sensitivity option selected by the user. In one configuration, the value of $N_E$ for the first, second and third options is respectively set to 5, 5, and $\infty$. The latter indicates a setting which is so large that the threshold is never satisfied.

In step 518, a medium search is performed on those satellites in the fourth set. A medium search is defined as one that emphasizes accuracy and sensitivity rather than speed, but does so to a lesser degree than a deep search. From step 518, the method proceeds with step 526.

In one example, the medium search is characterized by a total integration time of 880 ms, a coherent integration time of 20 ms, and a number of coherent integrations which are non-coherently combined equal to 44. It should be understood that these values are only provided as examples of the values that might be used and should not be assumed to have any special significance.

In step 520, the time required to performed a deep search on the satellites in the fourth set is estimated. This time is compared with the maximum time available. If estimate exceeds the maximum time, indicating there is insufficient time to conduct a deep search, the method proceeds to step 522. Otherwise, the method proceeds with step 524.

In one example, the time estimate is based on quality of service considerations. In a second example involving a PDE-initiated or mobile-terminated search, such as that stemming from a 911 call by a subscriber station in an IS-801 compliant system, the maximum time is the Preferred Response Quality (PRQ) value specified by the PDE. In a third example, for a mobile-initiated search, such as that involving an Internet geography-based search initiated by the subscriber station, the maximum time is assigned by the subscriber station.

In step 522, a medium search is performed on the satellites in the fourth set. The medium search was described previously in relation to step 518. From step 522, the method proceeds to step 526.

In step 524, a deep search is performed for the satellites in the fourth set. A deep search is defined as one that emphasizes accuracy and sensitivity rather than speed, and does so to a greater degree than a medium search.

In one example, a deep search is characterized by a total integration time of 1760 ms, a coherent integration time of 80 ms and a number of coherent integrations which are non-coherently combined equal to 22. These values should be understood to be provided as examples and should not be taken to have any particular significance.

In one configuration, since the coherent integration time exceeds the 20 ms time period over which a data bit is modulated onto a satellite signal, the coherent integration in the deep search is performed with sensitivity assistance from the PDE to account for phase changes that occur within the 80 ms coherent integration time.

From step 524, the method proceeds to step 526. In step 526, measurements are derived for those satellites in the fourth set. The method then concludes.

Figure 6:
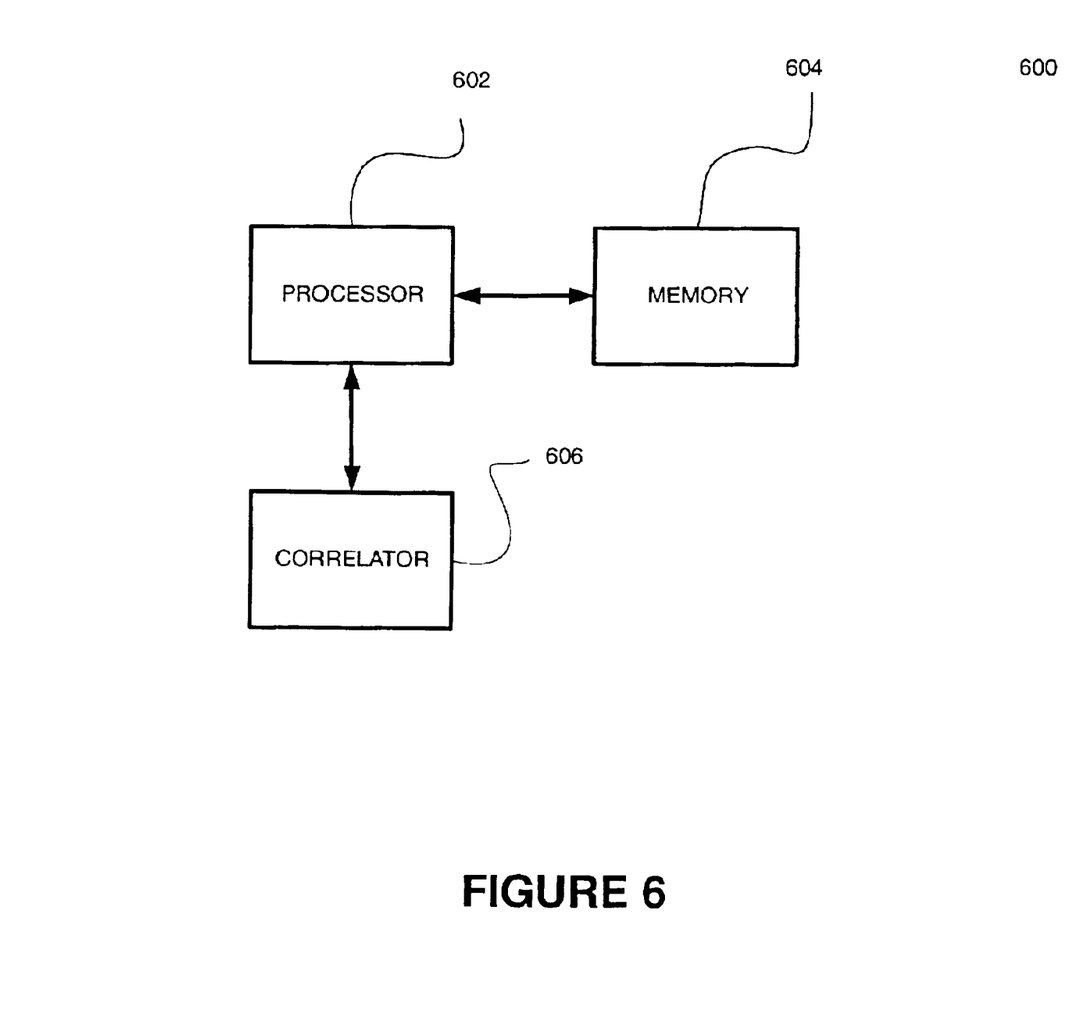
FIG. 6 is a block diagram of a system for searching for signals useful in determining the position of an entity in accordance with one embodiment of the disclosed subject matter.

An embodiment of a system 600 for searching for signals useful in determining the position of an entity is illustrated in FIG. 6. As illustrated, the system 600 comprises a processor 602, a memory 604, and a correlator 606.

The correlator 606 is configured to produce correlation functions from signals provided to it by a receiver (not shown). The correlator 606 provides the correlation functions to the processor 602, either directly or through memory 604. The correlator 606 may be implemented in hardware, software, or a combination of hardware and software.

The memory 604 tangibly embodies a series of software instructions for performing any of the methods of FIGS. 2, 3, or 5A–5B, or any of the embodiments, implementations, or examples described or suggested herein.

The processor 602 is configured to access and execute the software instructions tangibly embodied by the memory 604. Through execution of these instructions, the processor 602 directs the correlator 606 to perform a first search for signals useful in determining the position of an entity. The processor 602 then derives measurements from the resulting correlation function provided to it by the correlator 606. The processor then determines whether the derived measurements satisfy one or more selected exit criteria. If so, the processor 602 terminates the search. If not, the processor 602 directs the correlator 606 to perform a second search for signals useful in determining the position of the entity.

Figure 7:
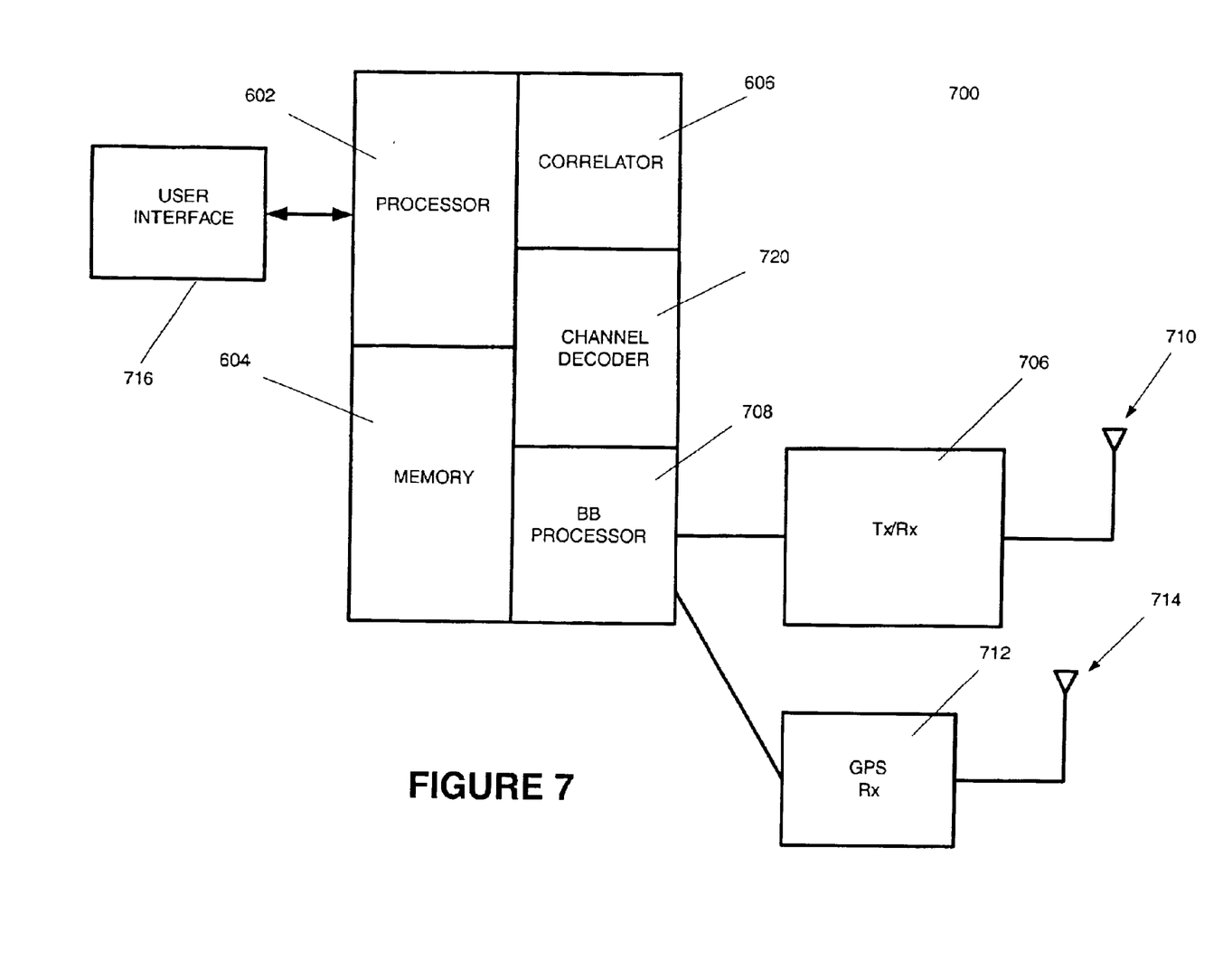
FIG. 7 is a block diagram of a subscriber station in a wireless communications system incorporating the system of FIG. 6.

An embodiment of a subscriber station 700 in a wireless communication system is illustrated in FIG. 7. This particular the subscriber station 700 is configured to embody or incorporate the system 600 of FIG. 6.

Radio transceiver 706 is configured to modulate baseband information, such as voice or data, onto an RF carrier, and demodulate a modulated RF carrier to obtain baseband information.

An antenna 710 is configured to transmit a modulated RF carrier over a wireless communications link and receive a modulated RF carrier over a wireless communications link.

Baseband processor 708 is configured to provide baseband information from processor 602 to transceiver 706 for transmission over a wireless communications link. The processor 602 in turn obtains the baseband information from an input device within user interface 716. Baseband processor 708 is also configured to provide baseband information from transceiver 706 to processor 602. processor 602 in turn provides the baseband information to an output device within user interface 716.

User interface 716 comprises a plurality of devices for inputting or outputting user information, such as voice or data. The devices typically included within the user interface include a keyboard, a display screen, a microphone, and a speaker.

GPS receiver 712 is configured to receive and demodulate GPS satellite transmissions, and provide the demodulated information to correlator 606.

Correlator 606 is configured to derive GPS correlation functions from the information provided to it by GPS receiver 712. For a given PN code, correlator 606 produces a correlation function defined over a range of code phases which define a search window. Each individual correlation is performed in accordance with defined coherent and non-coherent integration parameters.

Correlator 606 is also configured to derived pilot-related correlation functions from information relating to pilot signals provided to it by transceiver 706. The subscriber station 700 uses this information to acquire wireless communications services.

Channel decoder 720 is configured to decode channel symbols provided to it by baseband processor 708 into underlying source bits. In one example in which the channel symbols are convolutionally encoded symbols, the channel decoder is a Viterbi decoder. In a second example in which the channel symbols are serial or parallel concatenations of convolutional codes, the channel decoder 720 is a turbo decoder.

Memory 604 in configured to hold software instructions embodying any of the methods of FIGS. 2, 3, 5A–5B, or any of the embodiments, implementations, or examples thereof which have been described or suggested.

The processor 602 is configured to access and execute these software instructions. Through execution of these software instructions, the processor 602 analyzes the GPS correlation functions provided to it by correlator 606, derives measurements from the peaks thereof, and determines whether the position of the subscriber station 700 can be determined based on these measurements, or whether searching is required in order to determine the position of the entity.

The processor 602 is also configured to determine the root mean square error (RMSE) associated with each of the measurements. These measurements and RMSE values are provided to a PDE (not shown). The PDE weights each of the measurements based on the inverse of its corresponding RMSE value, and then estimates the location of the subscriber station 700 based on the weighted measurements. Alternatively, the subscriber station 700 determines its own location from this information.

While various embodiments, implementations and examples have been described, it will be apparent to those of ordinary skill in the art that additional embodiments, implementations and examples that have not be explicitly disclosed are within the scope of the claimed invention. In particular, embodiments are possible where the claimed invention is employed to derive measurements useful in determining the position of an entity from base station transmissions, or combinations of base station and GPS satellite transmissions. Consequently, the invention is not to be limited except by the appended claims.

What is claimed is:

1. A method of performing a search for signals useful in determining the position of an entity comprising:

performing a first search for signals useful in determining the position of the entity as part of a position determination attempt, wherein the first search comprises searching for satellites in a first set;

deriving one or more measurements from the ensuing search results;

determining whether the measurements satisfy one or more selected exit criteria;

avoiding additional searching within the position determination attempt if the measurements satisfy the one or more selected exit criteria; and performing a second search for signals useful in determining the position of the entity if the measurements do not satisfy the one or more selected exit criteria, wherein those satellites in the first set which satisfy a predetermined noise threshold form a second set, those satellites in the first set which satisfy a second threshold form a third set, those satellites in the first set but excluding the third set form a fourth set, the second search is avoided if the number of satellites in the third set, equals the number of satellites in the first set.

2. The method of claim 1 wherein the measurements from the satellites in the second set define a polygon, and the second search is avoided if the area of the polygon, equals or exceeds a predetermined threshold.

3. The method of claim 2 wherein the second search is avoided if the number of satellites in the second set, equals or exceeds a predetermined threshold.

4. A method of performing a search for signals useful in determining the position of an entity comprising:

performing a first search for signals useful in determining the position of the entity as part of a position determination attempt, wherein the first search comprises searching for satellites in a first set;

deriving one or more measurements from the ensuing search results;

determining whether the measurements satisfy one or more selected exit criteria;

avoiding additional searching within the position determination attempt if the measurements satisfy the one or more selected exit criteria; and performing a second search for signals useful in determining the position of the entity if the measurements do not satisfy the one or more selected exit criteria, wherein those satellites in the first set which satisfy a predetermined noise threshold form a second set, those satellites in the first set which satisfy a second threshold form a third set, those satellites in the first set but excluding the third set form a fourth set, and the peak carrier signal to noise ratio for each of the measurements in the second set is summed, and the second search is avoided if the sum equals or exceeds a predetermined threshold.

5. A method of performing a search for signals useful in determining the position of an entity comprising:

performing a first search for signals useful in determining the position of the entity as part of a position determination attempt, wherein the first search comprises searching for satellites in a first set:

deriving one or more measurements from the ensuing search results;

determining whether the measurements satisfy one or more selected exit criteria;

avoiding additional searching within the position determination attempt if the measurements satisfy the one or more selected exit criteria; and performing a second search for signals useful in determining the position of the entity if the measurements do not satisfy the one or more selected exit criteria, wherein those satellites in the first set which satisfy a predetermined noise threshold form a second set, those satellites in the first set which satisfy a second threshold form a third set, those satellites in the first set but excluding the third set form a fourth set, and the second search is limited to those satellites in the fourth set.

6. A memory storing a sequence of software instructions embodying a method for performing a search for signals useful in determining the position of an entity, the method comprising:

performing a first search for signals useful in determining the position of the entity as part of a position determination attempt;

deriving one or more measurements from the ensuing search results;

determining whether the measurements satisfy one or more selected exit criteria;

avoiding additional searching within the position determination attempt if the measurements satisfy the one or more selected exit criteria; and performing a second search for signals useful in determining the position of the entity if the measurements from the first search do not satisfy the one or more selected exit criteria, wherein the first search comprises searching for satellites in a first set, those satellites in the first set which satisfy a predetermined noise threshold form a second set, those satellites in the first set which satisfy a second, second threshold form a third set, and those satellites in the first set but excluding the satellite of the third set form a fourth set, and the second search is avoided if the number of satellites in the third set, equals the number of satellites in the first set.

7. The memory of claim 6 wherein the measurements for the satellites in the second set define a polygon, and the second search is avoided if the area of the polygon, equal or exceed a predetermined threshold.

8. The memory of claim 6 wherein the second search is avoided if the number of measurements in the second set, equal or exceed a predetermined threshold.

9. The memory of claim 6 wherein the peak carrier signal to noise ratio is summed for each of the measurements in the second set, and the second search is avoided if the sum equals or exceeds a predetermined threshold.

10. The memory of claim 6 wherein the second search is limited to those satellites in the fourth set.

* * * * *